(12) United States Patent
Huang

(10) Patent No.: US 8,098,339 B2
(45) Date of Patent: Jan. 17, 2012

(54) INTEGRATED SINGLE PANEL PROJECTION ENGINE

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 92 days.

(21) Appl. No.: 12/821,918

(22) Filed: Jun. 23, 2010

(65) Prior Publication Data
US 2010/0321598 A1    Dec. 23, 2010

Related U.S. Application Data

(60) Provisional application No. 61/219,624, filed on Jun. 23, 2009.

(51) Int. Cl.
*G02F 1/1335* (2006.01)
(52) U.S. Cl. ..................... 349/5; 349/8; 349/9
(58) Field of Classification Search ............... 349/5, 8–9
See application file for complete search history.

*Primary Examiner* — Phu Vu
(74) *Attorney, Agent, or Firm* — J.C. Patents

(57) ABSTRACT

The present invention discloses an integrated single-panel projection engine (500) including a collimated light source (400), a main polarization beam splitter (200), a supporting polarization beam splitter (210), a reflective quarter wave plate (150), a mirror plate (160), an LCOS imager (100) and a projection lens system (300), which provides substantial improvement in optical efficiency of LCOS micro projection display.

10 Claims, 2 Drawing Sheets

INTEGRATED SINGLE PANEL PROJECTION ENGINE

CROSS-REFERENCE TO RELATED APPLICATIONS

This application claims priority of provisional application No. 61/219,624, filed on Jun. 23, 2009, entitled "AN INTEGRATED SINGLE PANEL LCOS PROJECTION ENGINE", which is incorporated herein by reference in its entirety.

FIELD OF THE TECHNOLOGY

The present invention relates to a liquid crystal based microdisplay projection system, particularly to an integrated single-panel projection engine.

BACKGROUND

Microdisplay projection systems typically employ a transmissive or a reflective microdisplay imager, commonly referred to as a light valve or light valve array, which imposes an image on an illumination light beam. One of the important advantages on reflective light valves over transmissive light valves is that reflective light valves permit controlling circuitry to be placed in situ behind the reflective surface, and more advanced integrated circuit technology is available because the substrate materials are not limited by their opaqueness.

Reflective liquid-crystal-on-silicon (LCOS) imagers rotate while modulate the polarization of incident light. Thus, polarized light is either reflected by the LCOS imager with its polarization state substantially unmodified, or with a degree of polarization rotation imparted to provide a desired grey scale. Accordingly, a polarized light beam is generally used as the input beam for reflective LCOS imagers, while a polarization beam splitter (PBS) is typically employed for splitting the incoming light beam to two polarized light beams in orthogonal polarization states.

Widely used for various portable and handheld micro projection display applications, a single-imager engine employs one LCOS modulation imager and one PBS. One of the most obvious drawbacks of this optical projection engine is that only limited portion of illumination light in one polarization state is used for illuminating the LCOS imager and therefore, after modulation and reflection by the LCOS imager, total illumination projected through a projection lens system onto a projection screen is limited, which results in low optical efficiency.

SUMMARY

The present invention provides an integrated single-panel projection engine in order to improve optical efficiency of projection display.

One aspect of the present invention provides an integrated single-panel projection engine including a collimated light source, a main polarization beam splitter, a supporting polarization beam splitter, a reflective quarter wave plate, a mirror plate, an LCOS imager and a projection lens system.

The collimated light source emits a collimated illumination beam along a first direction containing a source polarization first-state beam in first polarization state and a source polarization second-state beam in second polarization state orthogonal to first polarization state; the main polarization beam splitter configured in an angle α close to -degree with the first direction transmits the source polarization first-state beam while reflect light in second polarization state and reflects the source polarization second-state beam in second polarization state as a second polarization second-state beam in a second direction perpendicular to the first direction, and reflects a the first modulated polarization second-state beam a and a second modulated polarization second-state beam b coming from the LCOS imager as a first projection polarization second-state beam a and a second projection polarization second-state beam b respectively; the supporting polarization beam splitter configured in an angle β close to -degree with the main polarization beam splitter transmits the second polarization second-state beam and reflects the second polarization first-state beam coming from the mirror plate as a third polarization first-state beam; the reflective quarter wave plate configured in parallel to the first direction converts the second polarization second-state beam from second polarization state to first polarization state as the second polarization first-state beam in first polarization state; the mirror plate configured in parallel to the reflective quarter wave plate reflects the second polarization first-state beam back to the supporting polarization beam splitter.

The LCOS imager configured perpendicular to the first direction and opposite to the collimated light source from the main polarization beam splitter in which a first half facing area of the LCOS imager is adapted to perpendicularly receive and modulate the source polarization first-state beam transmitting through the main polarization beam splitter as a first modulated polarization second-state beam a in second polarization state, and a second half facing area of the LCOS imager is adapted to perpendicularly receive and modulate the third polarization first-state beam as a second modulated polarization second-state beam b in second polarization state; and the projection lens system parallel to the first direction and configured opposite to the reflective quarter wave plate and the mirror plate from the main polarization beam splitter receives and projects the first projection polarization second-state beam a and the second projection polarization second-state beam b to an external projection screen.

The integrated single-panel projection engine in the present embodiment includes a single LCOS imager and employs a pair of polarization beam splitters together with a quarter wave plate and a planar mirror plate in parallel, which recycles the source polarization second-state beam in second polarization state in the collimated illumination beam as the third polarization first-state beam in first polarization state for projection display together with the source polarization first-state beam in the collimated illumination beam so as to provide substantial improvement in optical efficiency of LCOS micro projection display.

BRIEF DESCRIPTION OF THE DRAWINGS

The disclosure may be more completely understood in consideration of the following detailed description of various embodiments in connection with the accompanying drawings, in which.

DETAILED DESCRIPTION

Figure 1:
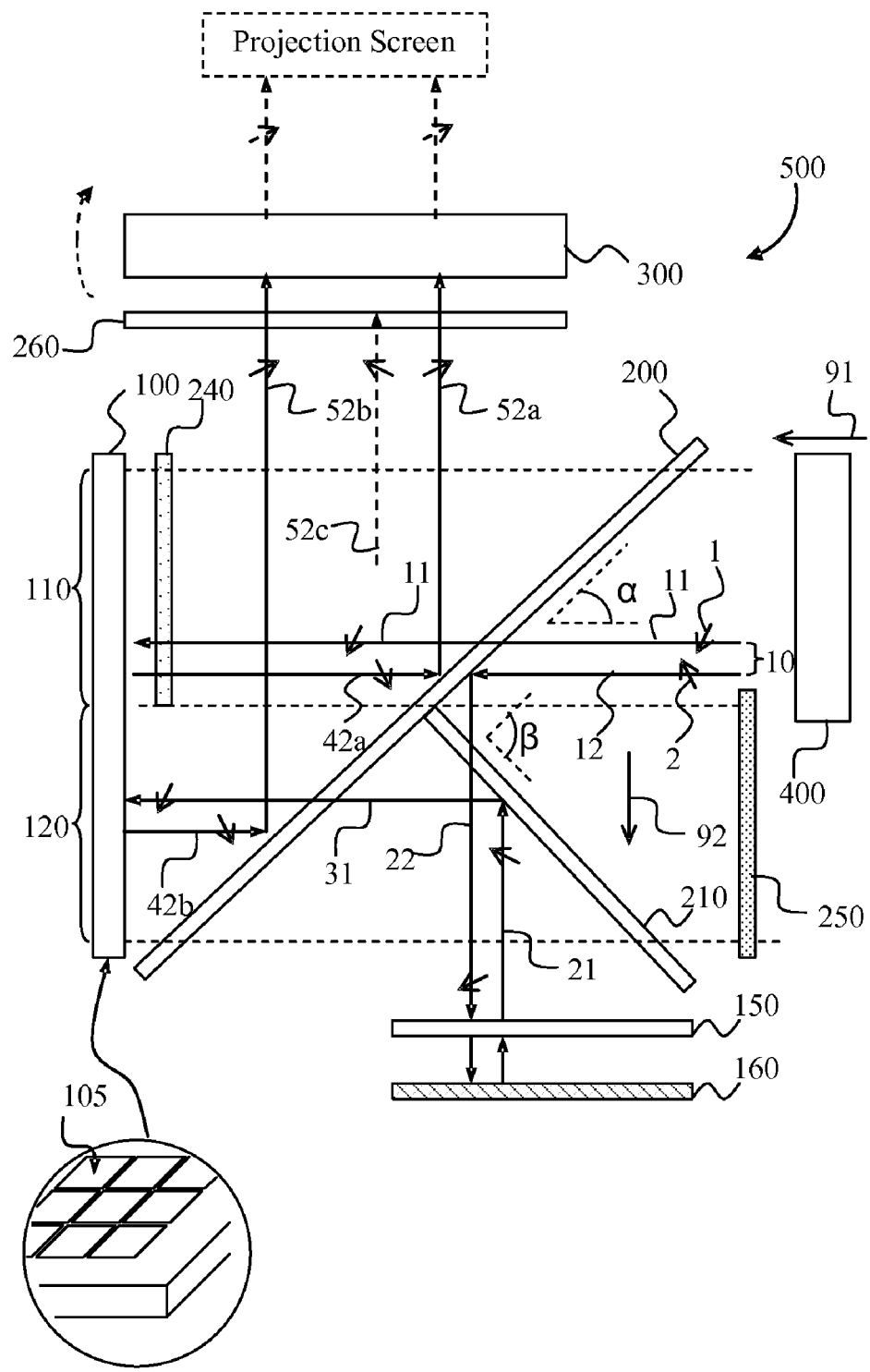
FIG. 1 provides a cross sectional view of the integrated single-panel projection engine 500, illustrating the embodiments of the present invention.

FIG. 1 illustrates a cross sectional view of the integrated single-panel projection engine 500 in an embodiment of the present invention. In this embodiment, the single-panel projection engine 500 includes: a collimated light source 400, a main polarization beam splitter 200, a supporting polarization beam splitter 210, a reflective quarter wave plate 150, a mirror plate 160, a LCOS imager 100 and a projection lens system 300.

As illustrated in FIG. 1, the collimated light source 400 emits a collimated illumination beam 10 along a first direction 91 towards the main polarization beam splitter 200 along the first direction 91. The collimated illumination beam 10 contains a source polarization first-state beam 11 in first polarization state 1 and a source polarization second-state beam 12 in second polarization state 2 orthogonal to first polarization state. Specifically, the collimated light source 400 employed in the integrated single-panel projection engine 500 may be generated by any one or combination of arc lamps, tungsten lamps, halide lamps, electromagnetic ballast, light emitting diodes and lasers.

In an included facing angle, α, substantially close to 45 degree with the first direction 91, the main polarization beam splitter 200 is configured for transmitting substantial portion of the source polarization first-state beam 11 in first polarization state 1 and reflecting substantial portion of the source polarization second-state beam 12 in second polarization state 2 as a second polarization second-state beam 22 in a second direction 92 perpendicular to the first direction 91.

The LCOS imager 100 is configured perpendicular to the first direction 91 and opposite to the collimated light source 400 from the main polarization beam splitter 200. Substantial portion of the source polarization first-state beam 11 in first polarization state, transmitting through the main polarization beam splitter 200, is thus perpendicularly received by a first half facing area 110 of the LCOS imager 100.

The supporting polarization beam splitter 210 is configured in an angle β substantially close to 90-degree with the main polarization beam splitter 200, for transmitting light of second polarization state while reflecting light of first polarization state, in the orthogonally reverse configuration to the main polarization beam splitter 200. And both the main polarization beam splitter 200 and the supporting polarization beam splitter 210 are either a multilayer polarization beam splitter film or a wire grid polarizer plate. Therefore, substantial portion of the second polarization second-state beam 22 in second polarization state transmits through the supporting polarization beam splitter 210 towards the reflective quarter wave plate 150.

Adequately configured in parallel, the reflective quarter wave plate 150 and the mirror plate 160 perpendicularly receive the second polarization second-state beam 22 transmitting through the supporting polarization beam splitter 210, convert the second polarization second-state beam 22 from second polarization state 2 to first polarization state 1 as the second polarization first-state beam 21 in first polarization state 1 and reflects the second polarization first-state beam 21 back towards the supporting polarization beam splitter 210.

Then, substantial portion of the second polarization first-state beam 21 in first polarization state is reflected by the supporting polarization beam splitter 210, as a third polarization first-state beam 31 towards the main polarization beam splitter 200, on a different area from where the first polarization first-state beam 11 is received.

The third polarization first-state beam 31 transmits through the main polarization beam splitter 200 and is perpendicularly received by a second half facing area 120 of the LCOS imager 100 simultaneously when the first half facing area 110 the perpendicularly receives the source polarization first-state beam 11. the latter portion corresponds to recycled illumination of first polarization state originally from the source polarization second-state beam 12 in second polarization state 2.

As illustrated in FIG. 1, the LCOS imager 100 may be formed by a plurality of modulation imager pixels 105 in a regularly tiled planar arrangement. The two adjunct image areas, the first half facing area 110 and the second half facing area 120 of the LCOS imager 100 jointly receive and by 90-degree polarization rotation, modulate adjunct illumination of micro images to the source polarization first-state beam 11 and the third polarization first-state beam 31 both in first polarization state 1 as a first modulated polarization second-state beam 42a and a second modulated polarization second-state beam 42b respectively, both in second polarization state 2 towards the main polarization beam splitter 200. Then, the main polarization beam splitter 200 further reflects the first modulated polarization second-state beam 42a and the second modulated polarization second-state beam 42b as a first projection polarization second-state beam 52a and a second projection polarization second-state beam 52b respectively, towards and led through the projection lens system 300.

The projection lens system 300 parallel to the first direction 91 is configured opposite to the reflective quarter wave plate 150 and the mirror plate 160 from the main polarization beam splitter 200 and the supporting polarization beam splitter 210. Eventually, the projection lens system 300 perpendicularly receives and projects the first projection polarization second-state beam 52a and the second projection polarization second-state beam 52b onto a projection screen outside the integrated single-panel projection engine 500, which realizes projection display.

The integrated single-panel projection engine 500 in the present embodiment includes a single LCOS imager and employs a pair of polarization beam splitters together with a quarter wave plate and a planar mirror plate in parallel, which recycles the source polarization second-state beam 12 in second polarization state 2 in the collimated illumination beam 10 as the third polarization first-state beam 31 in first polarization state 1 for projection display together with the source polarization first-state beam 11 in the collimated illumination beam 10 so as to provide substantial improvement in optical efficiency of LCOS micro projection display.

In addition, as shown in FIG. 1, the third polarization first-state beam 31 induced onto the second half facing area 120 of the LCOS imager 100, however, goes through a longer optical path than the first polarization first-state beam 11, originated from the source polarization second-state beam 12, reflected by the main polarization beam splitter 200, transmitting through the supporting polarization beam splitter 210 and the reflective quarter wave plate 150, reflected by the mirror plate 160 and transmitting through the reflective quarter wave plate 150 again, reflected by the supporting polarization beam splitter 210 and transmitting through the main polarization beam splitter 200. Thus, illumination onto the second half facing area 120 by the third polarization first-state beam 31 is less bright than one on the first half facing area 110. To balance the intensity difference, a compensating transparent plate 240, configured between the main polarization beam splitter 200 and the LCOS imager 100, adequately sized and aligned with the first half facing area 110, and adapted to reduce intensity of the source polarization first-state beam 11 so that the intensity of the source polarization first-state beam 11 perpendicularly received by the first half facing area 110 is equal to the intensity of the third polarization first-state beam 31 perpendicularly received by the second half facing area 120. Other means of adjusting the difference of illumination intensity onto those two areas of the LCOS imager 100 are applicable, including electrically correcting the difference by adjusting polarization modulation of the LCOS imager 100 via electrical control signals and instructions.

Besides, as shown in FIG. 1, the integrated single-panel projection engine 500 may further includes an illumination blocking plate 250, configured between the supporting polarization beam splitter 210 and the collimated light source 400, placed adequately aligned to the supporting polarization beam splitter 210. The illumination blocking plate 250 can block collimated illumination beam 10 directly from the collimated light source 400 to the supporting polarization beam splitter 210.

Furthermore, to eliminate the illumination noise 52c in first polarization state 1 likely resulting from undesired optical effects which is blended with first projection polarization second-state beam 52a and the second projection polarization second-state beam 52b in second polarization state 2, a polarization filter 260 is placed between the main polarization beam splitter 200 and the external projection screen, to block residual noise illumination 52c in first polarization state 1 from passing through, while to let go the image signal by with the first modulated polarization second-state beam 42a and the second modulated polarization second-state beam 42b in second polarization state 2, eventually to the external projection screen. Either such polarization filter 260 is placed between the main polarization beam splitter 200 and the projection lens system 300 as shown in FIG. 1, or alternatively the projection lens system 300 configured between the polarization filter 260 and the main polarization beam splitter 200 with the supporting polarization beam splitter 210.

Figure 2:
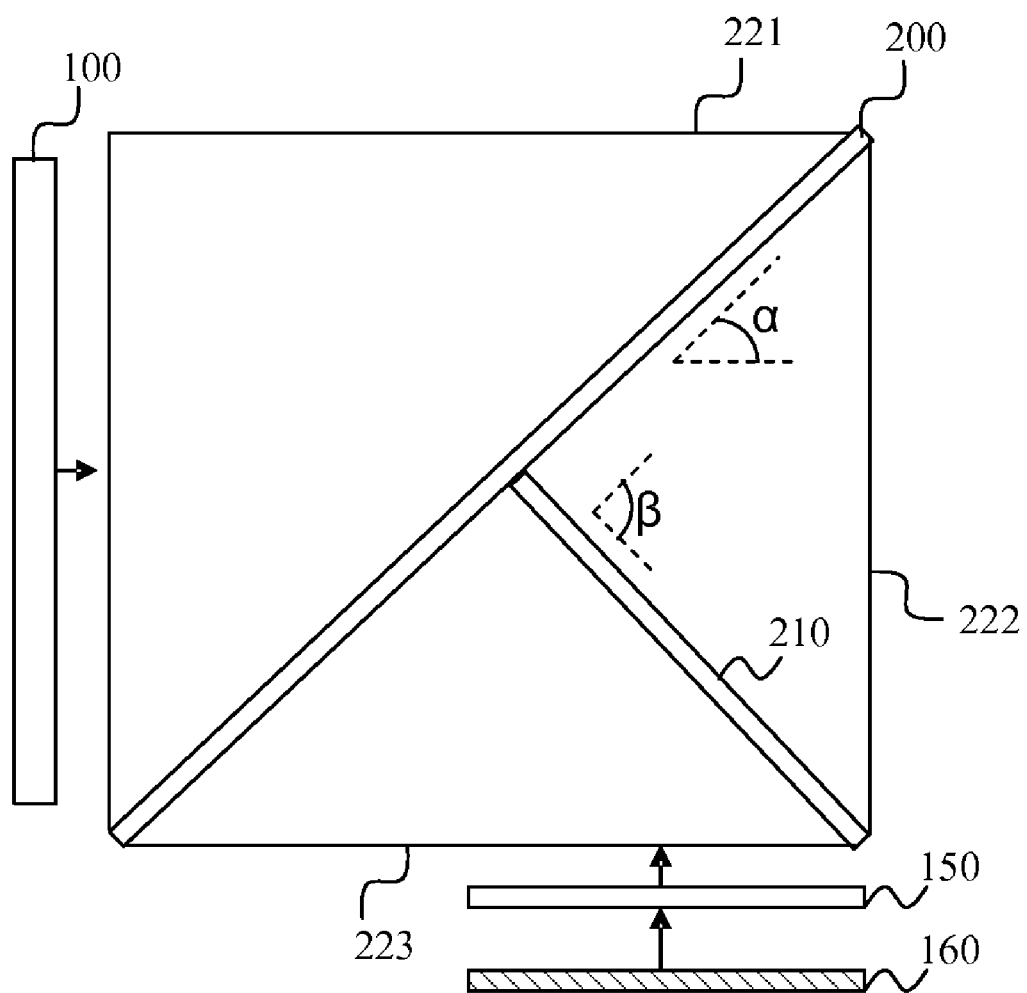
FIG. 2 provides a cross sectional view of the integrated single-panel projection engine 500 illustrating the extended embodiments of the present invention.

FIG. 2 provides a cross sectional view of the integrated single-panel projection engine 500 in another embodiment of the present invention. As shown in this figure, the main polarization beam splitter 200 is adherently sandwiched by a first prism 221, a second prism 222 and a third prism 223, while the supporting polarization beam splitter 210 is also adherently sandwiched by the second prism 222 and the third prism 223 such that a square shaped optical core integrating polarization beam splitting with polarization conversion is formed. Alternatively, the first prism 221, the second prism 222 and the third prism 223 are made from any one or combination of glasses, silicone and solid transparent organic materials including but not limited to polycarbonates and Polymethyl Methacrylate (PMMA).

This enables further adherent attachment of the LCOS imager 100 onto the first prism 221, and the stacked composite of the reflective quarter wave plate 150 and the mirror plate 160 onto the third prism 223, which provides improved mechanical and optical architecture accordingly for easing the assembly of the integrated single-panel projection engine 500.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. An integrated single-panel projection engine, comprising:
    a collimated light source, adapted to emit a collimated illumination beam along a first direction containing a source polarization first-state beam in first polarization state and a source polarization second-state beam in second polarization state orthogonal to first polarization state;
    a main polarization beam splitter, configured in an angle α close to -degree with the first direction, adapted to transmit the source polarization first-state beam while reflect light in second polarization state and reflect the source polarization second-state beam in second polarization state as a second polarization second-state beam in a second direction perpendicular to the first direction; and adapted to reflect a the first modulated polarization second-state beam a and a second modulated polarization second-state beam b coming from the LCOS imager as a first projection polarization second-state beam a and a second projection polarization second-state beam b respectively;
    a supporting polarization beam splitter, configured in an angle β close to -degree with the main polarization beam splitter, adapted to transmit the second polarization second-state beam and reflect the second polarization first-state beam coming from the mirror plate as a third polarization first-state beam;
    a reflective quarter wave plate, configured in parallel to the first direction, adapted to convert the second polarization second-state beam from second polarization state to first polarization state as the second polarization first-state beam in first polarization state;
    a mirror plate, configured in parallel to the reflective quarter wave plate, adapted to reflect the second polarization first-state beam back to the supporting polarization beam splitter;
    a liquid crystal on silicon (LCOS) imager, configured perpendicular to the first direction and opposite to the collimated light source from the main polarization beam splitter wherein a first half facing area of the LCOS imager is adapted to perpendicularly receive and modulate the source polarization first-state beam transmitting through the main polarization beam splitter as a first modulated polarization second-state beam a in second polarization state, and a second half facing area of the LCOS imager is adapted to perpendicularly receive and modulate the third polarization first-state beam as a second modulated polarization second-state beam b in second polarization state;
    a projection lens system, parallel to the first direction, configured opposite to the reflective quarter wave plate and the mirror plate from the main polarization beam splitter, and adapted to receive and project the first projection polarization second-state beam a and the second projection polarization second-state beam b to an external projection screen.

2. The integrated single-panel projection engine according to claim 1, further comprising a compensating transparent plate, configured between the main polarization beam splitter and the LCOS imager, adequately sized and aligned with the first half facing area, and adapted to reduce intensity of the source polarization first-state beam so that the intensity of the source polarization first-state beam perpendicularly received by the first half facing area is equal to the intensity of the third polarization first-state beam perpendicularly received by the second half facing area.

3. The integrated single-panel projection engine according to claim 1, further comprising an illumination blocking plate, configured between the supporting polarization beam splitter and the collimated light source, and adapted to block collimated illumination beam directly from the collimated light source to the supporting polarization beam splitter.

4. The integrated single-panel projection engine according to claim 1, wherein the main polarization beam splitter or the supporting polarization beam splitter is either a multilayer polarizing beam splitter film or a wire grid polarizer plate.

5. The integrated single-panel projection engine according to claim 1, further comprising a polarization filter, placed between the main polarization beam splitter and the external projection screen, adapted to transmit the first projection polarization second-state beam a and the second projection polarization second-state beam b in second polarization state but block illumination noise in first polarization state.

6. The integrated single-panel projection engine according to claim 1, wherein the collimated light source is generated by any one or combination of arc lamps, tungsten lamps, halide lamps, electromagnetic ballast, light emitting diodes and lasers.

7. The integrated single-panel projection engine according to claim 1, wherein the main polarization beam splitter is adherently sandwiched by a first prism, a second prism and a third prism, and the supporting polarization beam splitter is adherently sandwiched by the second prism and the third prism.

8. The integrated single-panel projection engine according to claim 7, wherein the LCOS imager is adherently attached to the first prism.

9. The integrated single-panel projection engine according to claim 7, wherein the stacked composite of the reflective quarter wave plate and the mirror plate is adherently attached to the third prism.

10. The integrated single-panel projection engine according to claim 7, wherein the first prism, the second prism and the third prism are made from any or a combination of glasses, silicone and solid transparent organic materials including polycarbonates and PMMA.

* * * * *